United States Patent [19]

Schlotman

[11] 4,027,851

[45] June 7, 1977

[54] FAUCET VALVE AND SEAL THEREFOR

[75] Inventor: Walter F. Schlotman, Bay Village, Ohio

[73] Assignee: Stanadyne, Inc., Windsor, Conn.

[22] Filed: June 27, 1975

[21] Appl. No.: 590,848

[52] U.S. Cl. .............. 251/172; 251/268; 251/282

[51] Int. Cl.² ...................... F16K 25/00

[58] Field of Search ............ 137/625.17; 251/172, 251/221, 225, 268, 269, 282, 363

[56] References Cited

UNITED STATES PATENTS

| 1,291,183 | 1/1919  | Schulder        | 251/268    |
|-----------|---------|-----------------|------------|
| 1,739,864 | 12/1929 | Schardein       | 251/221    |
| 1,772,406 | 8/1930  | Whiton          | 251/282    |
| 2,152,831 | 4/1939  | Williams        | 251/282    |
| 2,629,580 | 2/1953  | Schultis et al. | 251/221    |
| 2,634,758 | 4/1953  | Ojalvo          | 251/269    |
| 2,703,584 | 3/1955  | Mix             | 251/363    |
| 3,428,087 | 2/1969  | Moen            | 137/625.17 |
| 3,730,222 | 5/1973  | Moen            | 251/172    |

FOREIGN PATENTS OR APPLICATIONS 528,596   3/1954   Belgium ................ 251/225

Primary Examiner—Martin P. Schwadron
Assistant Examiner—G. L. Walton
Attorney, Agent, or Firm—Kinzer, Plyer, Dorn & McEachran

[57] ABSTRACT

A fluid valve for use in a two handle faucet assembly has a housing, a sleeve within the housing, a stem positioned within the sleeve with a handle portion extending outside of the sleeve and housing, and a reciprocal piston. Rotation of the stem causes reciprocation of the piston. A grommet-type seal is attached to the interior end of the sleeve, adjacent its inlet, and has a portion extending within the sleeve toward the axially movable piston. The seal portion extends in the direction of fluid flow through the valve with the piston closing against the direction of fluid flow onto the extending portion of the seal to effect opening and closing of the valve.

14 Claims, 11 Drawing Figures

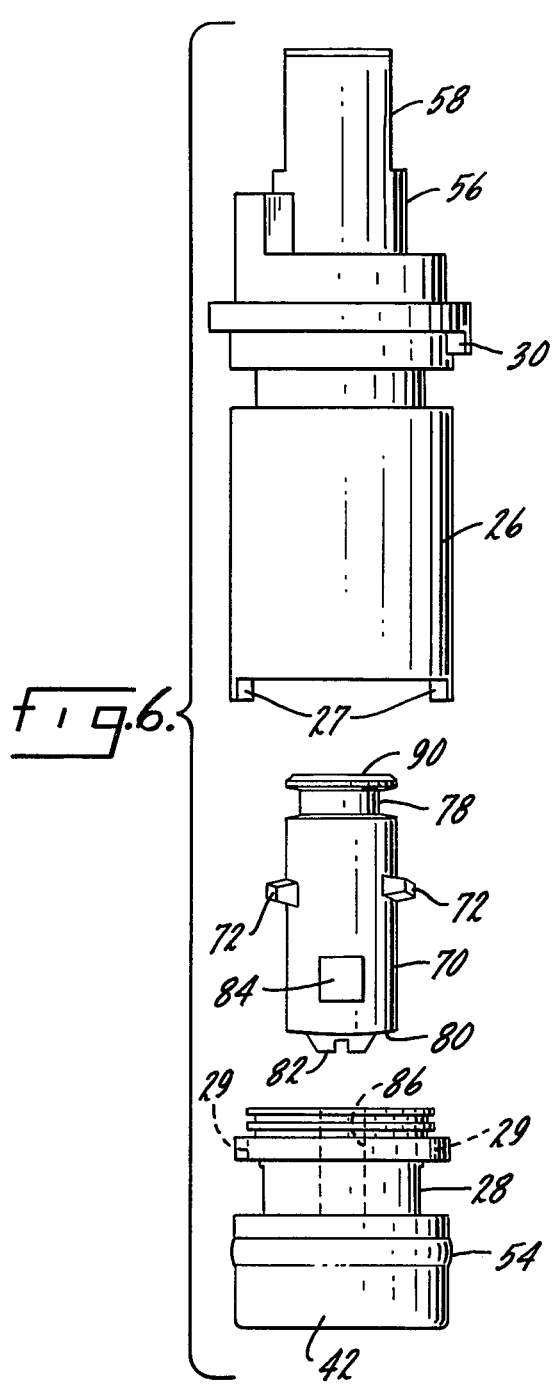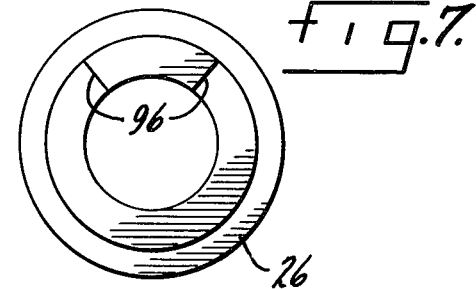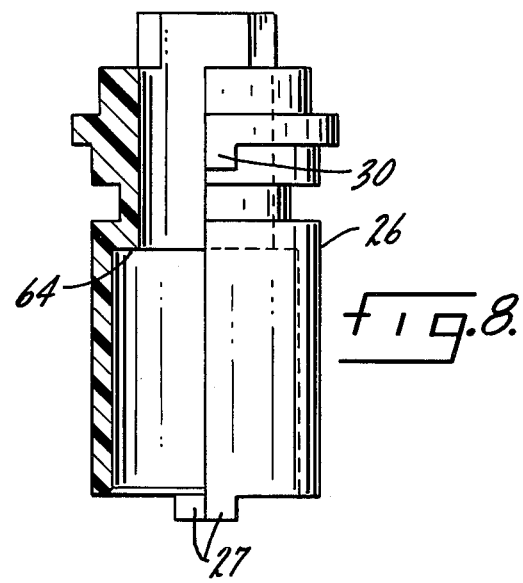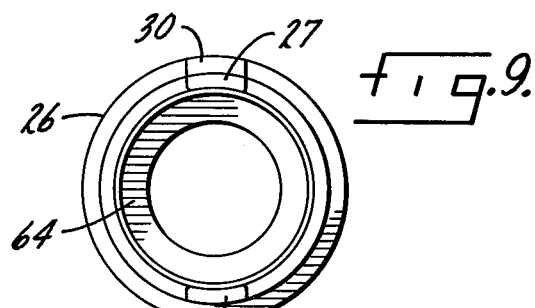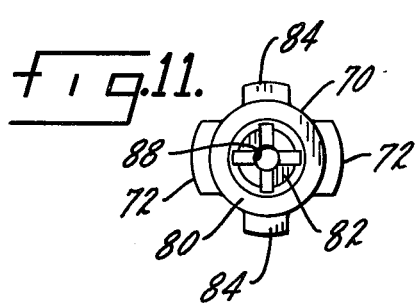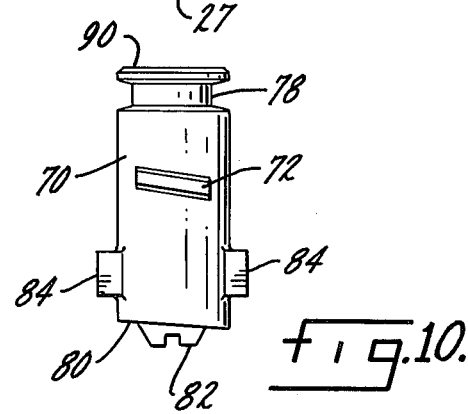

FAUCET VALVE AND SEAL THEREFOR

SUMMARY OF THE INVENTION

The present invention relates to fluid valves, particularly valves usable in a two handle faucet assembly.

A primary purpose of the invention is a simply constructed reliably operated valve of the type described in which a major portion of the components thereof are formed of a suitable plastic.

Another purpose is a valve of the type described in which there is pressure assisted sealing action for closing the valve.

Another purpose is a valve of the type described in which an axially movable piston is substantially pressure balanced in the open position.

Another purpose is a fluid valve of the type described in which the valve is pressure balanced toward closing, in the closed position thereof.

Another purpose is a fluid valve of the type described using a grommet-type seal in which the valve closure member moves against the direction of fluid flow to provide for pressure assisted sealing.

Another purpose is a valve of the type described in which the valve closure member moves away from the seal, permitting foreign matter to be flushed through the valve without damaging the seal.

Another purpose is a valve of the type described in which there is no permitted wear between the seal and movable valve closure member.

Other purposes will appear in the ensuing specification, drawings and claims.

BRIEF DESCRIPTION OF THE DRAWINGS

The invention is illustrated diagrammatically in the following drawings wherein:

FIG. 6 is an exploded view of the valve assembly, FIG. 7 is a top view of the sleeve member, FIG. 8 is a half section of the sleeve member, FIG. 9 is a bottom view of the sleeve member, FIG. 10 is a side view of the piston, and FIG. 11 is a bottom view of the piston.

DESCRIPTION OF THE PREFERRED EMBODIMENT

Figure 1:
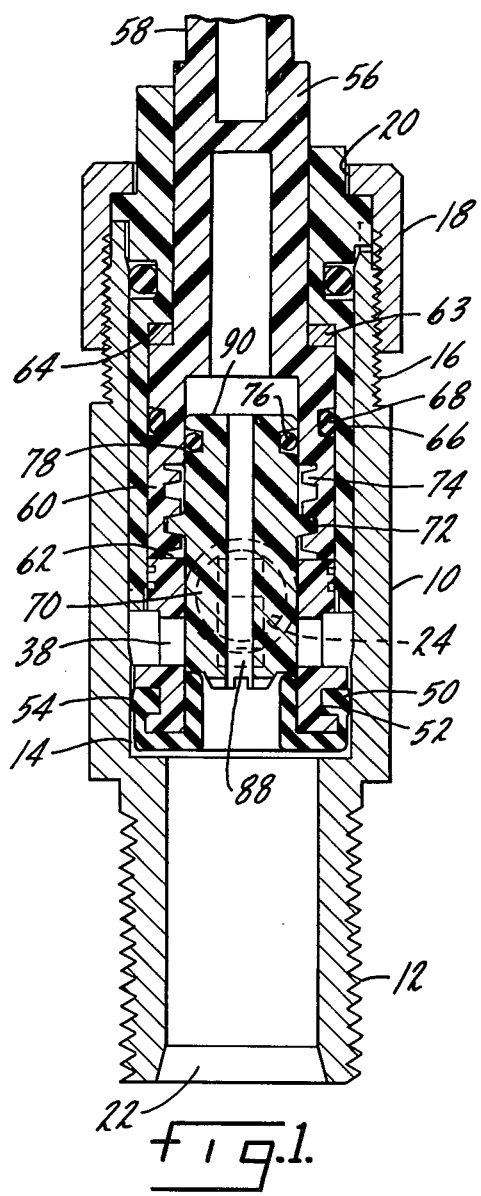
FIG. 1 is an axial section through the valve.
Figure 2:
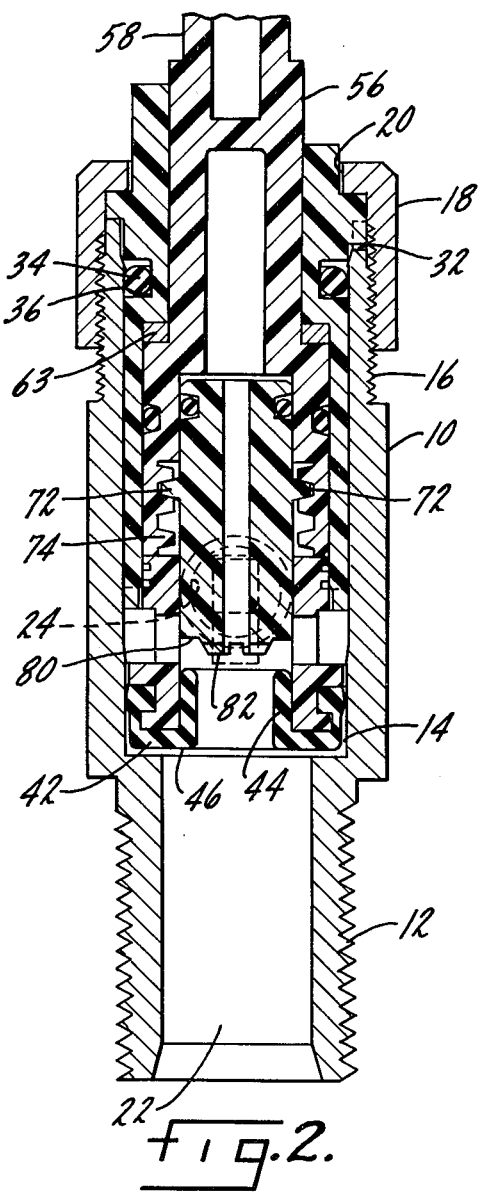
FIG. 2 is an axial section, similar to FIG. 1, but with the valve in an open position.
Figure 3:
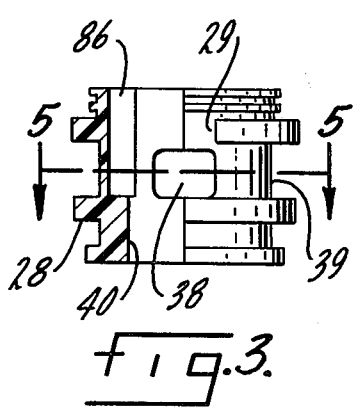
FIG. 3 is a half section of the bottom cap.
Figure 4:
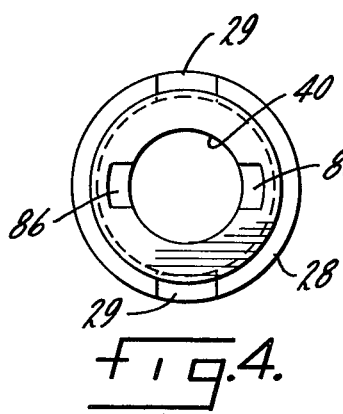
FIG. 4 is a top view of the bottom cap.
Figure 5:
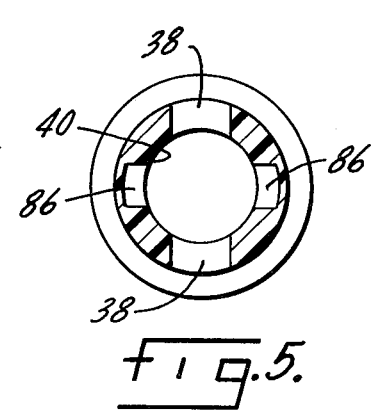
FIG. 5 is a sectional view, taken on line 5—5 of FIG. 3, of the bottom cap.

The valve disclosed herein has particular application in a two handle faucet assembly in which there are typically two valves, one for hot water and one for cold water. The valve structure, however, has substantially wider application.

A valve housing is indicated generally at 10 and may have an axially extending threaded inlet portion 12 which may be suitably attached to a conduit or the like for directing a fluid, for example hot or cold water, into the hollow interior 14. The housing 10 may have a threaded portion 16 adjacent the opposite end which will threadedly mount a closure cap 18. Cap 18 has a generally central opening 20, which receives a portion of the stem for mounting a suitable exterior handle or the like. Both cap 18 and housing 10 are preferably formed of metal, for example brass, but may in some applications be made of plastic.

Housing 10 has an inlet 22, which directs water axially into space 14 and a radially-extending outlet 24 which will typically be connected to a small conduit to convey water to a spout.

Positioned within space 14 of housing 10 is a sleeve construction including a sleeve member 26 and a bottom cap 28, both of which may be formed of a suitable plastic, for example CELCON. Sleeve member 26 may have a projection 30 which extends within a mating notch 32 in the end of housing 10 for properly positioning the sleeve member relative to the housing. An annular seal member or O-ring 34 is positioned within a groove 36 in the exterior of sleeve member 26 and forms a seal between the sleeve member and the housing. The inner end of sleeve member 26 has projections 27 which interlock with mating notches 29 in the opposing surface of bottom cap 28.

Bottom cap 28 may have a pair of openings 38 generally on opposite sides thereof which are in communication with an annular exterior groove 39 which connects with outlet 24 in housing 10. Openings 38 also communicate with interior 40 of the bottom cap.

A grommet-like seal member 42 is attached to the inner end of bottom cap 28 and has an axially inwardly-extending portion 44 which is positioned inside of bottom cap 28 and an end portion 46 which lies flat against the end of bottom cap 28. Seal member 42 has an inwardly-directed annular flange 50 which fits within a mating groove 52 in bottom cap 28 to thereby attach the seal to the cap. At the location of flange 50 there is an outwardly-extending radial bead 54 which is in sealing contact with the interior of housing 10. Inwardly-extending portion 44 may have an end surface which is round, as shown, or it may be flat, slanted or otherwise.

Positioned within the overall sleeve structure is a stem 56 having a handle portion 58 which extends outwardly through opening 20 in end cap 18 for supporting a suitable handle or the like. Stem 56 has an enlarged portion 60 which is held between an end surface 62 of bottom cap 28 and a thrust washer 63 positioned between portion 60 and an annular shoulder 64 of sleeve member 26. Thrust washer 63 prevents the transmission of torsional force from the stem to the sleeve. Thus, stem 56 is fixed against axial movement, but is permitted to rotate. Enlarged portion 60 of stem 56 has a groove 66 containing an O-ring 68 which is in sealing contact with the interior of sleeve member 26.

Reciprocal within stem 56 is a piston 70 having an exterior thread 72 which mates with an interior thread 74 on stem 56. Piston 70 carries an O-ring 76 positioned within a groove 78, which O-ring is in sealing contact with the interior of stem 56. Piston 70 has an end surface 80 positioned for contact with the axially extending portion 44 of seal 42 to effect closure of the valve member. Surface 80 may have a slight taper, for example 3°, to eliminate possible chatter. In the alternative, the taper may be eliminated. Adjacent sealing surface 80 there is a projecting annular surface 82 which will extend partially within annular seal portion 44 when the valve is fully closed.

Piston 70 may have a plurality, for example two, spaced projections 84 which extend into mating and equally sized notches 86 on the inside of bottom cap 28. The interlock between the projections and notches prevents rotation of piston 70, while permitting it to move in an axial direction toward and away from the grommet seal at the end of the sleeve construction.

Piston 70 has an interlock bore 88 which places interior surface 90 on piston 70 in communication with the valve inlet. Surface 82 may have a slot 91 which is effective to protect bore 88 from foreign particles. Surface 90 has generally the same pressure-responsive area as the combination of surfaces 82 and 80 on piston 70 and thus these surfaces form generally equal and opposite pressure-responsive areas for balancing piston 70, as will be described.

The outer end of sleeve member 26 may have an outwardly-extending ear which provides rotational stop surfaces 96 which are used to limit movement of stem 56.

In operation, water will flow through housing inlet 22, through grommet seal 42, and assuming the valve is open, through outlets 38 in bottom cap 28 and out outlet 24 in housing 10. When the valve is so opened, any impurities in the water flow freely past the seal without in any way being lodged in or abrading the seal. Water pressure will be applied both to surface 90 and to surfaces 82 and 80 to thus provide substantially equal and oppositely-directed pressure forces on the piston so that it is balanced on its supporting threads.

To move piston 70, stem 56 is rotated. Such rotation causes the piston to move in an axial direction since the stem is held against reciprocation and the piston is held against rotation, but permitted to reciprocate. As piston 70 closes upon seal portion 44, it will be moving against the direction of fluid flow through the valve. When the piston is closed upon the seal member, it will move seal member 42 slightly away from bottom cap 28 so that the incoming water pressure will assist in forming the seal between seal portion 44 and the end of piston 70. Thus, there is a pressure-assisted sealing action in the valve member. There is no permitted wear between the seal and the piston since there is no rubbing action. Rather, the piston will simply contact the seal, move it slightly outwardly from the sleeve structure with pressure urging the seal back into contact with the piston.

When the valve is in the closed position, surface 90 will continue to receive water at inlet pressure. Since surface 90 is greater in cross sectional area than surface 82, which is the exposed surface at the other end of piston 70 when the valve is closed, the piston will be pressure biased toward closing.

Since the grommet-type seal member will move in response to pressure by piston 70, it is impossible to exert any mechanical loading on the seal. It is free to move in response to mechanical pressure and thus is not compressed.

Stem 56 and piston 70, as well as members 28 and 26 forming the sleeve construction, may all be formed of a suitable plastic, for example CELCON or the like. The use of such materials, within a metallic or brass housing, provides a simply constructed reliably operable valve, but one which may be inexpensively manufactured.

Whereas the preferred form of the invention has been shown and described herein, it should be realized that there may be many modifications, substitutions and alterations thereto.

The embodiments of the invention in which an exclusive property or privelege is claimed are defined as follows:

1. A fluid valve including hollow sleeve means, an axial inlet at one end of said sleeve means, at least one outlet in said sleeve means,
   seal means attached to said sleeve means adjacent its inlet, said seal means having an inner portion, an end portion lying flat against an end of said sleeve means and a portion extending outside of and interlocked with said sleeve means,
   adjustable valve means positioned within said sleeve means and movable toward and away from said sleeve means inlet and said annular seal means, said valve means having an end portion arranged for sealing contact with said seal means inner portion, movement of said valve means against the direction of flow through said sleeve means inlet into contact with said seal means closing said fluid valve, said seal means inner portion and end portions being axially movable in response to closing movement of said valve means.

2. A fluid valve including a housing, inlet and outlet means for said housing,
   hollow sleeve means within said housing, an axial inlet at one end of said sleeve means in communication with said housing inlet means, at least one outlet in said sleeve means in communication with said housing outlet means,
   seal means attached to said sleeve means adjacent its inlet and in sealing contact with said housing, said seal means having an annular portion extending within said hollow sleeve means in the direction of fluid flow through said sleeve means inlet, an end portion lying flat against an end of said sleeve means and a portion extending outside of and interlocked with said sleeve means,
   adjustable valve means positioned within said sleeve means and movable toward and away from said sleeve means inlet and said annular seal means extending portion, said valve means having an end portion arranged for sealing contact with said seal means annular portion, movement of said valve means against the direction of flow through said sleeve means inlet into contact with said seal means annular portion closing said fluid valve, said seal means annular portion and end portions being axially movable in response to closing movement of said valve means.

3. The structure of claim 1 further characterized by and including an annular notch adjacent said end of said sleeve means, said seal means having a portion interlocked with and projecting into said annular notch for attaching said seal means to said sleeve means.

4. The structure of claim 3 further characterized by and including an outwardly radially-extending surface on said seal means in sealing contact with said housing.

5. The structure of claim 1 further characterized in that said adjustable valve means includes a stem rotatable within said sleeve means and an axially movable piston extending within said stem.

6. The structure of claim 5 further characterized by and including a thread on the exterior of said piston and a mating thread on an interior portion of said stem, means on said sleeve means fixing said stem against axial movement, and means on said sleeve means fixing said piston against rotary movement, whereby rotation of said stem causes axial movement of said piston.

7. The structure of claim 6 further characterized by and including a plurality of projections extending radially outwardly from said piston, and a plurality of mating notches in said sleeve means for preventing rotation of said piston relative to said sleeve means.

8. The structure of claim 1 further characterized by and including generally equal and opposite fluid pressure balancing surfaces on said valve means.

9. The structure of claim 8 further characterized in that said valve means includes a reciprocal piston and a rotary stem, cooperating means for translating rotary movement of said stem into reciprocal movement of said piston, said generally equal and opposite fluid pressure balancing surfaces being formed on opposite ends of said piston.

10. The structure of claim 9 further characterized by and including an axially extending bore in said piston placing opposite ends thereof in communication.

11. The structure of claim 1 further characterized in that said sleeve means includes a sleeve member and a bottom cap, said seal means being attached to an end of said bottom cap.

12. The structure of claim 11 further characterized in in that said adjustable valve means includes a rotatable stem and an axially movable piston, said rotatable stem having a portion axially positioned by said sleeve member and said bottom cap.

13. The structure of claim 12 further characterized by and including cooperating means on said bottom cap and piston for preventing rotation of said piston relative to said bottom cap.

14. The structure of claim 13 further characterized in that said cooperating means includes a plurality of outwardly-directed lugs on said piston and a plurality of mating notches on said bottom cap.

* * * * *